US012669085B2

(12) United States Patent
Shi et al.

(10) Patent No.: US 12,669,085 B2
(45) Date of Patent: Jun. 30, 2026

(54) NON-RECUPERATED SUPERCRITICAL CARBON-DIOXIDE BRAYTON CYCLE HEATING FOR LIQUID NATURAL GAS-POWERED ENGINES

(71) Applicant: The Boeing Company, Arlington, VA (US)

(72) Inventors: Mingxuan Shi, Mukilteo, WA (US); Htet Htet Nwe OoMandzak, Long Beach, CA (US); Sho Sato, Mercer Island, WA (US)

(73) Assignee: The Boeing Company, Arlington, VA (US)

( * ) Notice: Subject to any disclaimer, the term of this patent is extended or adjusted under 35 U.S.C. 154(b) by 38 days.

(21) Appl. No.: 18/392,489

(22) Filed: Dec. 21, 2023

(65) Prior Publication Data

US 2025/0207529 A1      Jun. 26, 2025

(51) Int. Cl.
*F02C 3/22*          (2006.01)
*F02C 7/224*        (2006.01)

(52) U.S. Cl.
CPC ................ *F02C 3/22* (2013.01); *F02C 7/224* (2013.01); *F05D 2220/323* (2013.01); *F05D 2260/213* (2013.01)

(58) Field of Classification Search
CPC .. F01K 23/10; F02C 7/22; F02C 7/224; F02C 6/18; F05D 2220/323; F05D 2260/213
See application file for complete search history.

(56) References Cited

U.S. PATENT DOCUMENTS

| | | | |
|---|---|---|---|
| 9,341,084 B2 | 5/2016 | Xie et al. | |
| 11,465,766 B2 | 10/2022 | Stoia et al. | |
| 12,006,878 B2 * | 6/2024 | Brady ..................... | F02C 7/143 |
| 12,098,676 B1 * | 9/2024 | MacDonald ............. | F02C 3/06 |
| 2018/0298779 A1 * | 10/2018 | Kubota .................... | F01K 9/02 |

(Continued)

FOREIGN PATENT DOCUMENTS

EP          3048281 A1      7/2016

OTHER PUBLICATIONS

Stoia, M. F. et al.; "Integrated Power and Thermal Management System for High-Speed Aircraft"; AIAA Propulsion and Energy Forum; Aug. 9-11, 2021; American Institute of Aeronautics and Astronautics, Inc.; 6 pages.

(Continued)

*Primary Examiner* — Rodolphe Andre Chabreyrie
(74) *Attorney, Agent, or Firm* — Kolitch Romano Dascenzo Gates LLC

(57)          ABSTRACT

Systems and methods for combusting liquid natural gas (LNG) for use in turbofan engines in aircraft are disclosed. Various components use a non-recuperated supercritical carbon dioxide ($sCO_2$) Brayton cycle by the $sCO_2$ extracting heat from a heat exchanger through which flows primary exhaust of a gas turbine engine. The $sCO_2$ is split into dual streams. One stream flows through a $sCO_2$ turbine which turns a shaft coupled to a gearbox for performing useful work. The other stream is equalized in pressure and is recombined with the stream from the $sCO_2$ turbine. The recombined stream flows through an evaporator in the fuel injection system, which converts LNG to gaseous natural gas (GNG) suitable for combustion.

18 Claims, 3 Drawing Sheets

(56) References Cited

U.S. PATENT DOCUMENTS

| | | | |
|---|---|---|---|
| 2019/0128184 A1 | 5/2019 | Kim et al. | |
| 2019/0249599 A1* | 8/2019 | Sen | F02C 3/04 |
| 2022/0260036 A1 | 8/2022 | Stoia et al. | |
| 2023/0243308 A1 | 8/2023 | Jouan et al. | |
| 2024/0026824 A1* | 1/2024 | Terwilliger | F02C 3/22 |
| 2024/0271548 A1* | 8/2024 | Terwilliger | F01K 15/02 |
| 2024/0318593 A1* | 9/2024 | Terwilliger | F02C 7/141 |

OTHER PUBLICATIONS

Vesely, L. et al.; "Analysis of SCO2 Waste Heat Recovery System for Application in a Cement Plant"; ASME Turbo Expo 2022; Jun. 13-17, 2022; GT2022-83440; 11 pages.

Ahn, Y. et al.; "Review of Supercritical CO2 Power Cycle Technology and Current Status of Research and Development"; Nuclear Engineering and Technology; vol. 47; pp. 647-661; Elsevier Korea LLC on behalf of Korean Nuclear Society; 2015.

Stoia, M. et al.; "Design and Optimization of Primary/Core Heat Exchangers for Turbofan Engine Waste Heat Recovery"; AIAA SciTech 2023 Forum; Jan. 23-27, 2023; American Institute of Aeronautics and Astronautics, Inc.; 11 pages.

Vesely, L. et al.; "sCO2 Waste Heat Recovery System for Aircraft Engines"; AIAA SciTech 2022 Forum; Jan. 3-7, 2022; American Institute of Aeronautics and Astronautics, Inc.; 15 pages.

Patent Cooperation Treaty, International Search Report and Written Opinion of the International Searching Authority issued in related applicated PCT/US2024/050775, issued Dec. 2, 2025.

* cited by examiner

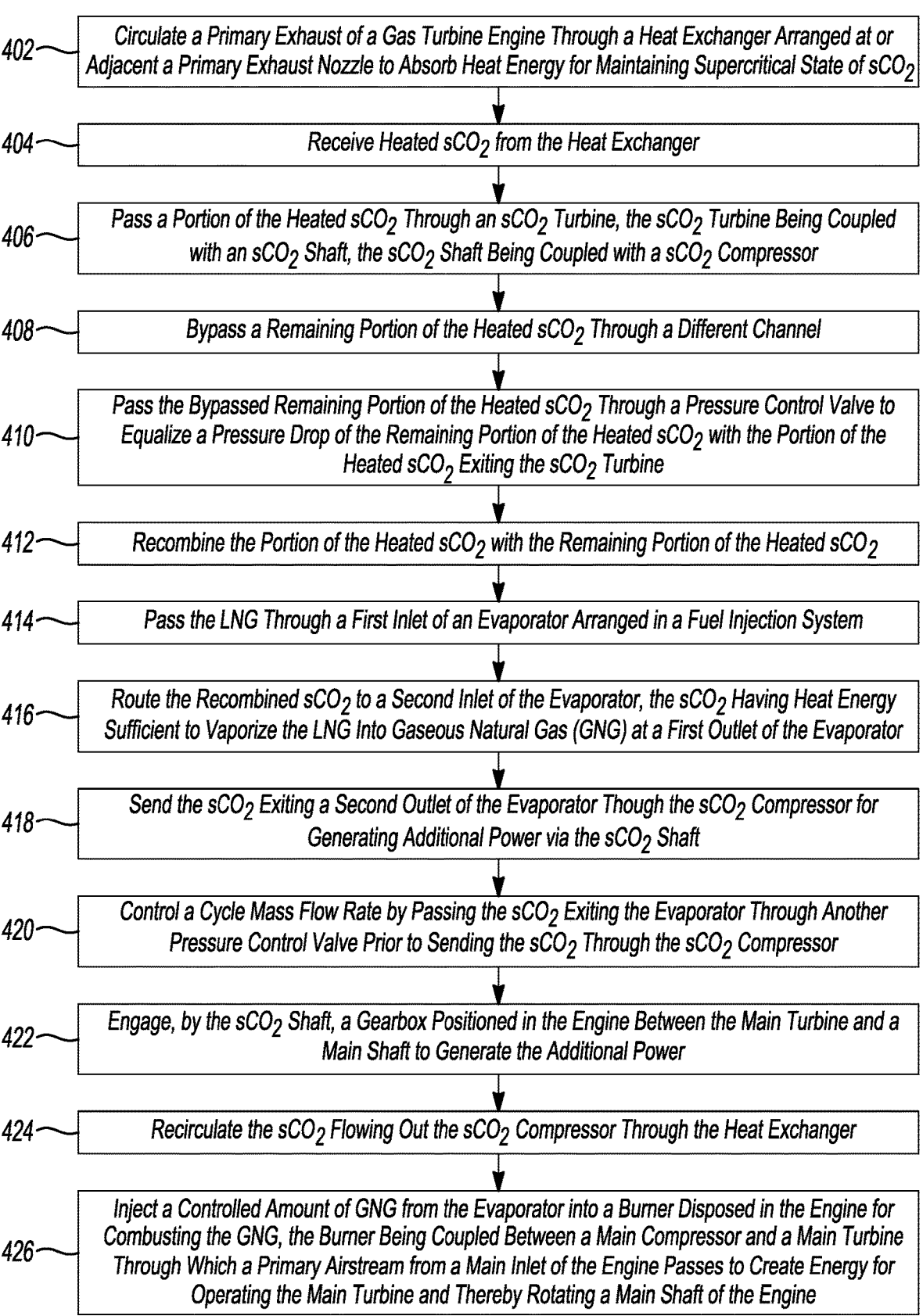

402 — Circulate a Primary Exhaust of a Gas Turbine Engine Through a Heat Exchanger Arranged at or Adjacent a Primary Exhaust Nozzle to Absorb Heat Energy for Maintaining Supercritical State of sCO₂

404 — Receive Heated sCO₂ from the Heat Exchanger

406 — Pass a Portion of the Heated sCO₂ Through an sCO₂ Turbine, the sCO₂ Turbine Being Coupled with an sCO₂ Shaft, the sCO₂ Shaft Being Coupled with a sCO₂ Compressor 408 — Bypass a Remaining Portion of the Heated sCO₂ Through a Different Channel 410 — Pass the Bypassed Remaining Portion of the Heated sCO₂ Through a Pressure Control Valve to Equalize a Pressure Drop of the Remaining Portion of the Heated sCO₂ with the Portion of the Heated sCO₂ Exiting the sCO₂ Turbine 412 — Recombine the Portion of the Heated sCO₂ with the Remaining Portion of the Heated sCO₂

414 — Pass the LNG Through a First Inlet of an Evaporator Arranged in a Fuel Injection System 416 — Route the Recombined sCO₂ to a Second Inlet of the Evaporator, the sCO₂ Having Heat Energy Sufficient to Vaporize the LNG Into Gaseous Natural Gas (GNG) at a First Outlet of the Evaporator 418 — Send the sCO₂ Exiting a Second Outlet of the Evaporator Though the sCO₂ Compressor for Generating Additional Power via the sCO₂ Shaft 420 — Control a Cycle Mass Flow Rate by Passing the sCO₂ Exiting the Evaporator Through Another Pressure Control Valve Prior to Sending the sCO₂ Through the sCO₂ Compressor 422 — Engage, by the sCO₂ Shaft, a Gearbox Positioned in the Engine Between the Main Turbine and a Main Shaft to Generate the Additional Power 424 — Recirculate the sCO₂ Flowing Out the sCO₂ Compressor Through the Heat Exchanger 426 — Inject a Controlled Amount of GNG from the Evaporator into a Burner Disposed in the Engine for Combusting the GNG, the Burner Being Coupled Between a Main Compressor and a Main Turbine Through Which a Primary Airstream from a Main Inlet of the Engine Passes to Create Energy for Operating the Main Turbine and Thereby Rotating a Main Shaft of the Engine

*Fig-4*

NON-RECUPERATED SUPERCRITICAL CARBON-DIOXIDE BRAYTON CYCLE HEATING FOR LIQUID NATURAL GAS-POWERED ENGINES

FIELD

The present disclosure generally relates to flight vehicles and, more specifically, to systems and methods for generating power for liquid natural gas-powered engines on the flight vehicles.

BACKGROUND

An increasingly popular field of research and development in the aircraft industry involves the use of liquid natural gas (LNG) and other types of cryogenic fuel in aircraft turbofan engines. The use of LNG-powered turbofan engines presents several potential benefits, including reduced carbon emissions, substantial reductions in nitrous oxide emissions, increased aircraft efficiency, and a higher specific energy than that of jet fuel. LNG also lacks a number of elements (e.g., soot, mercury, sulfur dioxide, etc.) in standard jet fuel that are otherwise pollutants. A shortcoming in existing and proposed LNG-based turbofan engines, however, is that the combustor requires LNG to be in the gaseous form, or gaseous natural gas (GNG), prior to combustion. Further, it is currently evident to researchers in the field that heat from existing aircraft sources is insufficient to transform LNG to GNG to enable combustion and thereby successfully sustain turbofan engine operation.

SUMMARY

The present disclosure addresses and overcomes the above-referenced shortcomings by employing components as part of systems or methods that create a non-recuperated Brayton cycle using supercritical carbon-dioxide (sCO$_2$) as the working fluid, together with heat energy from the primary exhaust of the gas turbine engine and an evaporator in the fuel injection system for absorbing sufficient heat energy from the circulating sCO$_2$ to successfully effectuate the conversion of LNG into GNG suitable for injecting the latter into the burner for combusting the GNG.

In one aspect of the present disclosure, a system for a liquid natural gas (LNG)-powered aircraft includes an LNG turbine engine. The engine includes a burner coupled between a main compressor and a main turbine, a main shaft coupled to the main turbine and the main compressor, and a heat exchanger through which primary exhaust gas from the engine flows for heating sCO$_2$.

The system further includes a fuel injection system coupled to the burner and including an evaporator, the evaporator including a first inlet through which LNG flows, and a first outlet. The system also includes components for implementing a non-recuperated supercritical carbon-dioxide (sCO$_2$) Brayton cycle. The components include an sCO$_2$ turbine coupled between the heat exchanger and a second inlet to the evaporator, an sCO$_2$ compressor having an input coupled to a second outlet of the evaporator and an output coupled to an input of the heat exchanger for recirculating sCO$_2$ through the heat exchanger, and an sCO$_2$ shaft coupled to the sCO$_2$ turbine and the sCO$_2$ compressor. Part or all of the sCO$_2$ heated from the heat exchanger flows through the sCO$_2$ turbine for rotating the sCO$_2$ shaft to operate the sCO$_2$ compressor. The sCO$_2$ from the evaporator second outlet is compressed by the sCO$_2$ compressor.

The system also includes a controller configured to control a flow of (1) the part or all of the sCO$_2$ to the second inlet of the evaporator to convert the LNG into gaseous natural gas (GNG) at the first outlet of the evaporator and (2) the GNG into the burner for combusting the GNG to operate the engine.

In various embodiments, the engine comprises a turbofan engine. The components may further include a pressure control valve disposed between the second output of the evaporator and the sCO$_2$ turbine. The pressure control valve may be configured to control a cycle mass flow rate of the sCO$_2$. The LNG may include methane-based LNG, but in some embodiments, the LNG for purposes of this disclosure may be deemed to include cryogenic fuels such as liquid hydrogen, or other variants as defined below. The heat exchanger may be positioned in or adjacent a primary engine nozzle. The main turbine may include a high pressure turbine and a low pressure turbine. The main shaft may include a high pressure shaft and a low pressure shaft. The main compressor may include a high pressure compressor and a low pressure compressor.

In various embodiments, the components include a controllable bypass. The controllable bypass may include a splitter disposed between the heat exchanger and an input to the sCO$_2$ turbine for receiving the sCO$_2$ heated from the heat exchanger and splitting the sCO$_2$ into first and second streams of the sCO$_2$. The first sCO$_2$ stream enters the sCO$_2$ turbine. The controllable bypass may also include a pressure valve configured to receive the second sCO$_2$ stream from the splitter and to equalize a pressure drop between the first sCO$_2$ stream at an output of the sCO$_2$ turbine and the second sCO$_2$ stream. The controllable bypass may further include a mixer arranged between the sCO$_2$ turbine output, an output of the pressure valve, and the second inlet to the evaporator. The mixer may be configured to recombine the first and second sCO$_2$ streams for supplying heat to the second evaporator inlet to vaporize the LNG. The engine may further include a gearbox coupled to the sCO$_2$ shaft, the main turbine, and the main shaft. The sCO$_2$ shaft and the gearbox may be configured to generate additional power. The controller may be configured to control, using the controllable bypass, how much power is used to generate the additional power and how much power is used to heat the LNG.

In another aspect of the disclosure, a method of a liquid natural gas (LNG)-powered gas turbine engine includes circulating a primary exhaust of a gas turbine engine through a heat exchanger arranged at or adjacent a primary exhaust nozzle to thereby absorb heat energy. The method further includes receiving heated sCO$_2$ from the heat exchanger and passing a portion of the heated sCO$_2$ through an sCO$_2$ turbine. The sCO$_2$ turbine is coupled with an sCO$_2$ shaft. The sCO$_2$ shaft is coupled with a sCO$_2$ compressor. The method further includes bypassing a remaining portion of the heated sCO$_2$ through a different channel, recombining the portion of the heated sCO$_2$ with the remaining portion of the heated sCO$_2$ and passing the LNG through a first inlet of an evaporator arranged in a fuel injection system. The method includes routing the recombined sCO$_2$ to a second inlet of the evaporator. The sCO$_2$ has heat energy sufficient to vaporize the LNG into gaseous natural gas (GNG) at a first outlet of the evaporator. The method further includes sending the sCO$_2$ exiting a second outlet of the evaporator through the sCO$_2$ compressor for generating additional power via the sCO$_2$ shaft, recirculating the sCO$_2$ flowing out the sCO$_2$ compressor through the heat exchanger, and injecting a controlled amount of the GNG from the evaporator into a burner disposed in the engine for combusting the GNG. The burner is coupled between a main compressor and a main turbine through which a primary airstream from a main inlet of the engine passes to create energy for operating the main turbine and thereby rotating a main shaft of the engine for operation.

In various embodiments, the amount of heat energy of the $sCO_2$ and the controlled amount of the GNG are regulated by a controller. The method may further include passing the bypassed remaining portion of the heated $sCO_2$ through a pressure control valve to equalize a pressure drop of the remaining portion of the heated $sCO_2$ with the portion of the heated $sCO_2$ exiting the $sCO_2$ turbine. In some embodiments, the method may include controlling a cycle mass flow rate, including passing the $sCO_2$ exiting the evaporator through another pressure control valve prior to sending the $sCO_2$ through the $sCO_2$ compressor. The method may include engaging, by the $sCO_2$ shaft, a gearbox positioned in the engine between the main turbine and a main shaft to generate the additional power. The fuel injection system may be positioned at a predetermined distance from the engine airstream. The engine may include a turbofan engine. The main turbine may include a plurality of turbines. The main compressor may include a plurality of respective compressors. The main shaft may include a plurality of respective shafts.

In yet another aspect of the disclosure, a system for a liquid natural gas (LNG)-powered aircraft includes an LNG turbine engine including a burner coupled between a main compressor and a main turbine, a main shaft coupled to the main turbine and the main compressor, a heat exchanger through which primary exhaust gas from the engine flows for heating $sCO_2$, and a gearbox coupled between the main turbine and the main shaft. The system also includes a fuel injection system coupled to the burner and including an evaporator, the evaporator including a first inlet through which LNG flows and a second inlet, and first and second outlets. The system further includes components for implementing a non-recuperated supercritical carbon-dioxide ($sCO_2$) Brayton cycle. The components include an $sCO_2$ turbine, an $sCO_2$ compressor, and an $sCO_2$ shaft coupled therebetween, an $sCO_2$ splitter coupled between the heat exchanger and an $sCO_2$ turbine and configured to split the $sCO_2$ into first and second $sCO_2$ streams, the first $sCO_2$ stream passing through the $sCO_2$ turbine, a first pressure control valve configured to equalize a pressure drop between the first $sCO_2$ stream at an output of the $sCO_2$ turbine and the second $sCO_2$ stream, a mixer configured to recombine the first $sCO_2$ stream at the $sCO_2$ turbine output and the second $sCO_2$ stream back into the $sCO_2$, and a second pressure control valve arranged between the $sCO_2$ compressor and the second evaporator outlet and configured to control a mass flow cycle rate. After being recombined, the $sCO_2$ is circulated through the evaporator via the second inlet and the second outlet. The $sCO_2$ has heat energy sufficient to vaporize the LNG flowing through the first inlet of the evaporator into a gaseous natural gas (GNG) at the first evaporator outlet. The $sCO_2$ compressor is coupled to the second evaporator outlet via the second pressure control valve and to an input of the heat exchanger for recirculating the $sCO_2$ exiting the second evaporator outlet through the heat exchanger. The $sCO_2$ shaft is configured to rotate to operate the (1) $sCO_2$ compressor, the $sCO_2$ compressor being configured to compress the $sCO_2$ from the evaporator second outlet via the second pressure control valve, and (2) the gearbox to generate additional power.

In various embodiments, the system further includes a controller configured to control an amount of (1) the heat energy sufficient to convert the LNG into GNG and (2) the GNG injected into the burner for combusting the GNG.

The above summary is not intended to represent every embodiment or every aspect of the present disclosure. Rather, the foregoing summary merely provides examples of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes the various combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, explain the principles of the disclosure.

FIG. 4 is an example flow diagram of a method for implementing the non-recuperated Brayton cycle according to an embodiment.

Figure 1:
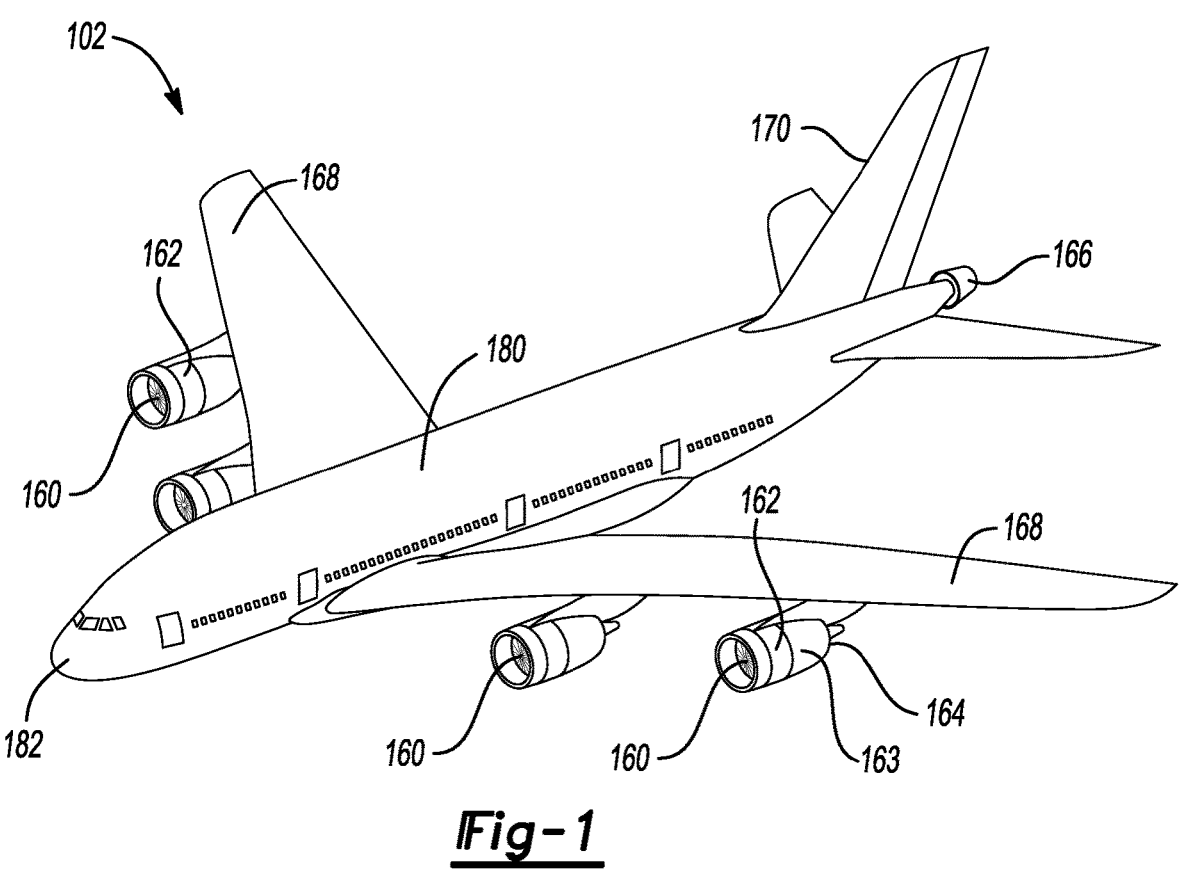
FIG. 1 is a perspective view of an aircraft having an integrated power generation system according to the present disclosure.

The appended drawings are not necessarily drawn to scale and may present a simplified representation of various features of the present disclosure, including, for example, specific dimensions, orientations, locations, and shapes. In some cases, well-recognized features in certain drawings may be omitted to avoid unduly obscuring the concepts of the disclosure. Details associated with such features may be determined in part by the particular intended application and use case environment.

DETAILED DESCRIPTION

The present disclosure includes embodiments in many different forms. Representative examples of the disclosure are shown in the drawings and described herein in detail as non-limiting examples of the disclosed principles. To that end, elements and limitations described in the Abstract, Field, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including," "containing," "comprising," "having," and the like shall mean "including without limitation." Moreover, words of approximation such as "about," "almost," "substantially," "generally," "approximately," etc., may be used herein in the sense of "at, near, or nearly at," or "within 0-5% of", or "within acceptable manufacturing tolerances", or logical combinations thereof. As used herein, a component that is "configured to" or "operable to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function. The word "coupled" to describe the connection between two components (e.g., through a cable a channel, a hardware connection, etc.) does not necessarily require that the connection be direct, unless otherwise specified in the claims.

The detailed description and the drawings or figures are supportive and descriptive of the present teachings, but the scope of the present teachings is defined solely by the claims. While some of the embodiments for carrying out the present teachings have been described in detail, various alternative designs and embodiments exist for practicing the present teachings defined in the appended claims. Moreover, this disclosure expressly includes combinations and subcombinations of the elements and features presented above and below.

FIG. 1 is a perspective view of an LNG-powered aircraft 102 having an integrated power generation system according to the present disclosure. The aircraft 102 may be operated manned or unmanned as desired. The aircraft 102 may be a large passenger jetliner, a small airplane for carrying limited personnel, or another airplane for carrying cargo. The aircraft 102 in other embodiments may be a high speed flight vehicle. The aircraft 102 is just one configuration of a flight vehicle capable of using different types of gas turbine engines, traveling at different speeds, and being equipped with other configurations as desired. For example, the aircraft 102 may have a different shape, size, aspect ratio, etc., as desired. Thus, the aircraft 102 is merely shown in a particular configuration for purposes of discussion.

The aircraft 102 has a fuselage 180, or body of the airplane which may house a cockpit and a passenger or cargo section. The aircraft in this embodiment has two wings 168, four liquid natural gas (LNG)-powered turbofan engines 162 (although another number of engines is possible), and an LNG tank 166 for carrying LNG at the necessary low temperatures, which in this embodiment happens to be disposed in the rear of the aircraft. An LNG engine may alternatively or additionally be integrated into a tail assembly 170, with the gas tanks in other examples integrated into the wings 168.

In some examples, the engine 162 may include a primary inlet nozzle 160 including a fan (partially viewable) into which a primary airstream is directed, a longitudinally-directed casing 163 which may house components including compressors, a combustor or burner, turbines, shafts, and a primary nozzle 164 operable for exiting primary exhaust gasses to generate thrust. The engine may in some embodiments include a splitter (not shown) peripherally surrounding the area of the primary airstream and used to create additional thrust. The aircraft 102 may include a nose cap 182 shaped to assist the aerodynamics of the aircraft during flight.

During operation of the aircraft 102, LNG may be sourced from a location such as LNG tank 166 and routed to the engines 162. Adjacent the engines include fuel injection systems (obscured from view) for injecting a gaseous form of LNG into the burner of each engine 162, as described in accordance with an aspect of the disclosure, below. The natural gas is combusted in the burner to ignite the air in the primary airstream, such that combustion results in sustained operation of the aircraft. The wings 168 and various areas of the aircraft 102, including regions adjacent the engine 162 or within the fuselage 180, may include electronic control circuitry for regulating the operation of the engine and the thermodynamic cycles that enable the engines to sustain ongoing thrust. It should be noted that, in addition to the engines having different positions or configurations, the engines may also include at least some of the components responsible for performing a function related to regulating a Brayton cycle. The electronic control systems may be included in the cockpit as well, and the components within the engine 162, as well as the fuel injection system and other components for executing thermodynamic cycles for enabling successful combustion in the engines may be coupled together within the aircraft in different regions. The electronic control system that controls operation of the engine and components that create heat for combustion is generally referred to as the controller of the aircraft 102, for simplicity and to maintain focus on key aspects of the disclosure.

In some embodiments, the aircraft 102 includes a system for generating power from the heated surface. Extracting heat from the surface also cools the surface, allowing the surface to be formed of materials that do not need to be rated for excessive temperature, thereby lowering material cost and reducing material weight. An example of such a system may be found in co-pending United States Patent Application Publication No. US 2022/0260036 A1, published on Aug. 18, 2002, and expressly incorporated by reference as if fully set forth herein.

In addition to the aircraft 102 of FIG. 1, a liquid natural gas (LNG)-powered engine may be equipped in a dedicated region of a smaller flight vehicle such as a fighter jet or drone, in which case the engine may be obscured from view and housed within the flight vehicle itself. In other embodiments, the LNG engines may be positioned on the wings the aircraft and/or at the tail (e.g., of a passenger airliner) as noted above.

Scientific consensus, based in part on information from original equipment manufacturer (OEM) aircraft engine manufacturers, has established that LNG needs to be converted into its gaseous (GNG) form prior to the successful initiation of combustion by the burner (also called the combustor) in a gas turbine engine. Accordingly, the LNG needs to be vaporized prior to sustaining functioning turbofan engines. As noted, however, existing heat sources from the aircraft are insufficient to generate an amount of heat sufficient to achieve this objective.

Consequently, in an aspect of the present disclosure, systems and methods are disclosed that rely on a non-recuperated supercritical carbon dioxide ($sCO_2$) Brayton Cyle to achieve the necessary heat to vaporize the LNG. In other aspects, these systems and methods may be further operable to increase power for other applications in the aircraft, such as aircraft 102. While a non-recuperated supercritical carbon dioxide ($sCO_2$) Brayton Cyle is demonstrated by way of embodiment, other techniques for evaporating LNG into GNG and combusting it are also possible and are deemed to fall within the spirit and scope of the present disclosure. By way of example, architectures that may be implemented in lieu of the non-recuperated $sCO_2$ Brayton cycle include recuperated Brayton cycles, cascade architectures, recompression architectures, variants thereof, and others. In addition, while the working fluid is $sCO_2$ in the embodiments to follow, other working fluids may be possible.

Figure 2:
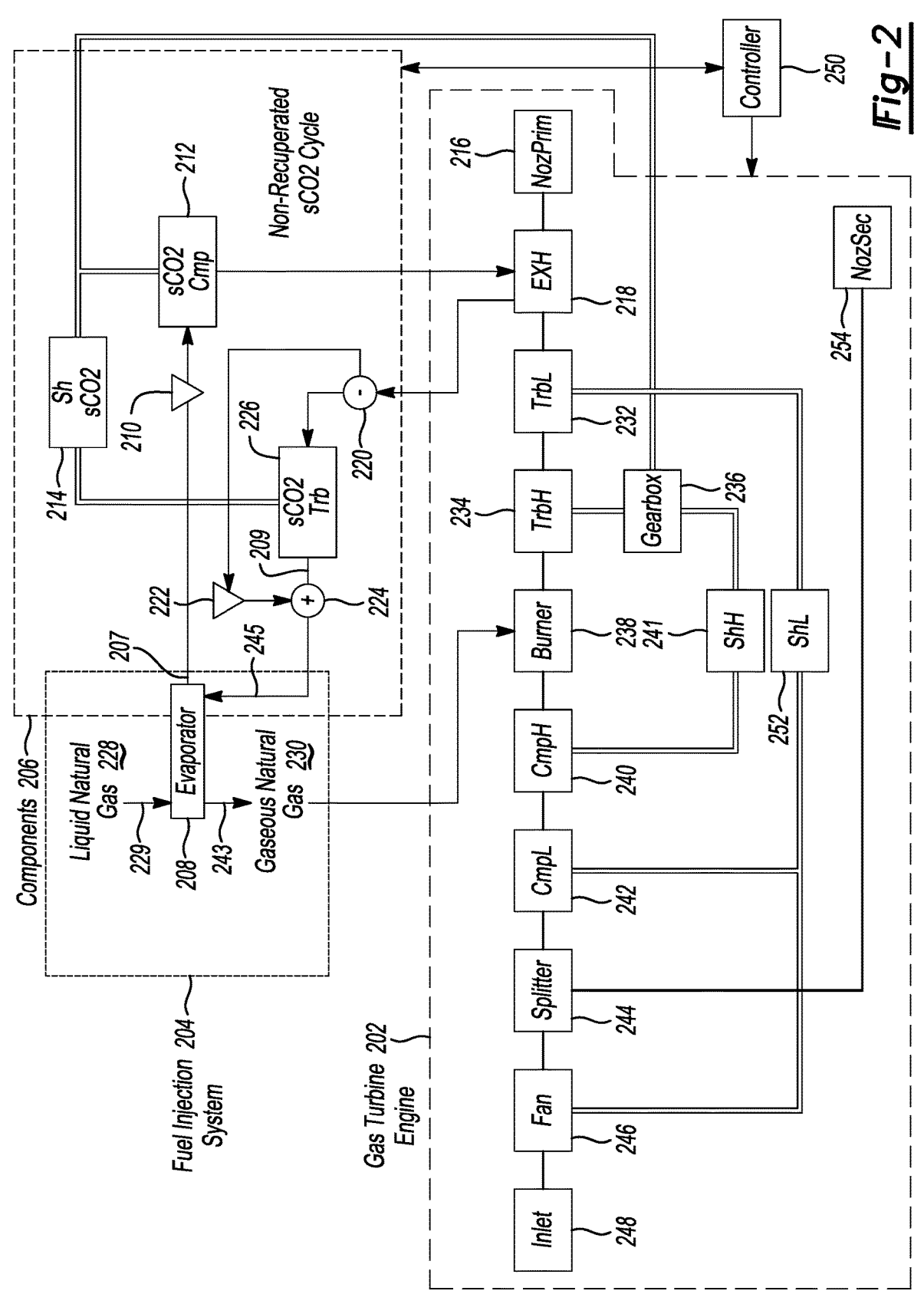
FIG. 2 is a block diagram of a gas turbine engine, a fuel injection system, and components for implementing a non-recuperated supercritical carbon dioxide ($sCO_2$) Brayton Cyle for liquid natural gas (LNG) fuel heating accordance to an aspect of the present disclosure.

FIG. 2 is a block diagram of gas turbine engine 202, a fuel injection system 204, and components 206 implementing a non-recuperated supercritical carbon dioxide ($sCO_2$) Brayton Cyle for liquid natural gas (LNG) fuel heating, in accordance with an aspect of the disclosure. The Brayton cycle is a thermodynamic cycle that more typically provides a description of operation of gas turbines. The general principle is to extract energy from a flowing mixture of air and fuel, for example, to perform work, including providing the necessary thrust for flight. The components 206 of FIG. 2 in this example implement a non-recuperated Brayton cycle with $sCO_2$ as the working fluid. The other fluids involved in the relevant heat exchanges during the course of the non-recuperated $sCO_2$ Brayton cycle are described further below.

The example diagram of FIG. 2 discloses using the heat from the primary engine exhaust to ultimately evaporate the LNG into GNG via the non-recuperated $sCO_2$ Brayton cycle. In gas turbine engines, the primary engine exhaust typically exits the engine through a primary nozzle 216, which may be the last longitudinal stage of the engine. The diagram of FIG. 2 has the additional advantages of concurrently improving overall system efficiency by providing further capability to generate additional power to increase engine thrust or for other uses, as discussed in more detail below. Gas turbine engines may include a splitter 244 circumferentially disposed around the main engine inlet for receiving a secondary airstream, which may build pressure and exit throughout a secondary nozzle (NozSec) 254, which typically can create significant thrust in existing engines. The splitter 244 used in existing gas turbine engines is different from the splitter 220, the latter of which is operable according to various embodiments to partition a working fluid ($sCO_2$) stream into two $sCO_2$ streams for purposes of controlling heat energy transfer, as described herein.

With reference to FIG. 2, the non-recuperated $sCO_2$ Brayton cycle operates to link the fuel injection system 204 with the LNG-power gas turbine engine 202. While turbofan engines are discussed herein for example purposes, the principles of this disclosure may equally apply to other types of proposed or operational LNG-powered engines. The non-recuperated $sCO_2$ Brayton cycle in accordance with an embodiment will now be described. For purposes of clarity, a random point in time is selected in the cycle at an outlet 207 of the evaporator 208 originating in the fuel injection system 204. After a stream of $sCO_2$ (hereinafter sometimes just "$sCO_2$") exits the evaporator 208 at the outlet 207, the $sCO_2$ initially travels through a pressure control valve 210. While the specific location of the elements relative to the engine or the aircraft may vary based on the particular design and other criteria, the pressure control valve 210 is one of the components 206 involved in implementing the non-recuperated $sCO_2$ Brayton cycle. The pressure control valve 210 may be used to control the cycle mass flow rate of the $sCO_2$ by changing the pressure drop between the outlet 207 of the evaporator 208 and the $sCO_2$ compressor 212 by a specified amount (e.g., as directed by a controller 250). After the cycle mass flow rate is set, the $sCO_2$ is compressed by the $sCO_2$ compressor 212, thereby increasing the pressure of the $sCO_2$. (In subsequent cycles, compressor 212 may be used to repressurize the $sCO_2$ as the $sCO_2$ cyclically passes through the compressor 212). Following the compression, the $sCO_2$ is recirculated through the heat exchanger 218. The heat exchanger 218 may be longitudinally arranged relative to the engine 202 right before, or within, the engine primary nozzle 216 through which the engine primary exhaust gases exit the engine 202. The heat exchanger 218 may be of any suitable design in which a first fluid is introduced (the primary exhaust gases) and in which a second fluid ($sCO_2$), physically separated from the first fluid by a thermo-conductive material, absorbs the heat from the first fluid. At the heat exchanger 218, the $sCO_2$ absorbs heat from the heat exchanger 218 due to the very high temperatures of the primary engine exhaust. As noted, in some embodiments, the heat exchanger 218 may be physically positioned in or adjacent the primary nozzle 216 so that at least a portion of the flowing hot gases can be captured as the airstream flows through the engine 202 and out the primary nozzle 216.

It is also noteworthy that the arrowed and non-arrowed lines between the various components through which the $sCO_2$ in the Brayton cycle passes (e.g., the evaporator 208, the pressure control valve 210, the $sCO_2$ compressor 212, the heat exchanger 218, splitter 220, $sCO_2$ turbine 226, pressure control valve 222, mixer 224, and back to the evaporator 208) may also be referred to as fluid channels. The fluid channels or conduits are manufactured to withstand the high pressures and temperatures of the $sCO_2$ flowing through them.

Figure 3:
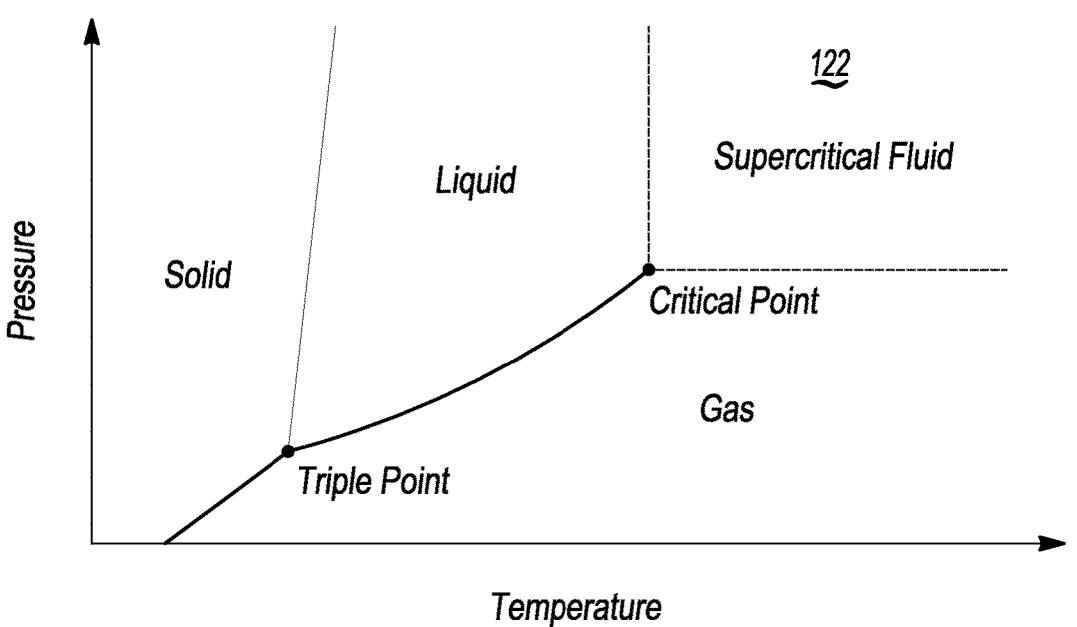
FIG. 3 is a graph illustrating an exemplary phase diagram of a supercritical fluid for use in the power generation system of FIG. 2.

Heat from the thermo-conductive material in the heat exchanger 218 enables the $sCO_2$ to maintain a temperature and pressure above its critical point. FIG. 3 graphically illustrates the critical point of a substance, where temperatures and pressures above the critical point will result in a supercritical fluid 122. The substance in this example is $sCO_2$. It will be noted in FIG. 3 that a fluid exceeding a prescribed combination of both pressure and temperature will eventually reach its critical point. One objective in this embodiment is to maintain the gas at or above its critical point to ensure the $sCO_2$ Brayton cycle continues and that the $sCO_2$ contains sufficient heat to power the burner to execute combustion, as well as to generate additional power for still further thrust and/or other uses.

In an embodiment, after being recirculated through a channel in the heat exchanger 218, the newly heated $sCO_2$ travels from the heat exchanger 218 to a controllable splitter 220, where the $sCO_2$ is split into dual $sCO_2$ streams. The main stream of $sCO_2$ flows through the $sCO_2$ turbine 226 for use in power extraction. The $sCO_2$ turbine is a discrete component 206 from the engine turbines, the former being used to generate power in the non-recuperated Brayton cycle. For example, the main $sCO_2$ stream may cause the $sCO_2$ turbine 226 to turn a shaft (e.g., $sCO_2$ shaft (Sh $sCO_2$) 214 to initiate the conversion of some prescribed amount of heat energy from the $sCO_2$ into useful work. The secondary $sCO_2$ stream is routed to another pressure control valve 222. The pressure control valve 222 is configured to allow the secondary $sCO_2$ stream to achieve the same pressure drop as the main $sCO_2$ stream exiting the turbine at output 209. Thereafter, the main and secondary $sCO_2$ streams are equalized in pressure and recombined into a single $sCO_2$ stream by mixer 224.

Referring still to FIG. 2, components 206 therefore include a controllable bypass feature ("controllable bypass") characterized by controllable splitter 220, $sCO_2$ turbine 226, pressure control valve 222, mixer 224, $sCO_2$ shaft 214, and the interconnections between each of these components. One or more of these components may be controlled by a controller 250, which may broadly be construed to be one or more processors, similar or dissimilar, or other hardware components positioned closely together or separated from each other. The controller including one or more of these elements controls how much of the heated $sCO_2$ is used for additional power generation to provide additional thrust (or in other examples, to provide additional power sources to the aircraft for different uses), versus how much power in the form of heat energy is identified as sufficient to heat the LNG. The relative quantities of $sCO_2$ in the main $sCO_2$ stream and the secondary $sCO_2$ stream may be set by the controller 250 depending on the amount of power needed for LNG combustion, for example, with the remaining amount available to supply additional power for use by the aircraft engine 202 to create thrust or for other uses. The controller bypass or other components 206 may include sensors to feed information back to the controller, such as pressure temperature and other variables germane to the cycle. The sensors are omitted from FIG. 2 to avoid further obscuring the principles of operation of the disclosure.

As an example of the above controllable bypass, the controller 250 may determine that the heated $sCO_2$ from the heat exchanger 218 may contain more heat energy than is sufficient to convert the LNG to GNG for combustion. In this case, the controller may adjust the controllable splitter 220 by specifying how much of the heated $sCO_2$ should be sent as part of the main $sCO_2$ stream to the $sCO_2$ turbine, versus how much of the heated $sCO_2$ should bypass the $sCO_2$ turbine as part of the secondary $sCO_2$ stream. The main $sCO_2$ stream operates the $sCO_2$ turbine, which in turn rotates the $sCO_2$ shaft 214 for generating additional power. Because operating the $sCO_2$ turbine 226 requires work, the main $sCO_2$ stream will lose a certain amount of heat energy. The $sCO_2$ turbine 226 is used (subject to unavoidable thermodynamic losses) to generate the additional power described above. After the secondary $sCO_2$ stream flows through the pressure control valve 222 to equalize the pressure drop between the first stream at the output 209 of $sCO_2$ turbine 226 and the secondary $sCO_2$ stream, the main and secondary $sCO_2$ streams are recombined by the mixer 224 into the single $sCO_2$, as noted above.

The two streams are consequently recombined in a manner that provides a prescribed amount of heat to the evaporator 208 for converting the LNG to GNG. It should be noted that the controller 250 may be coupled to, and may control, other components in the controller bypass as well, such as pressure control valve 222, mixer 224, $sCO_2$ turbine 226, etc. In short, the controllable bypass can be used to prevent excessive wasted heat energy such as in a case where the heated $sCO_2$ from the heat exchanger was circulated directly to the evaporator 208 in the fuel injection system 204. In this case, it may be undesirable to subject the LNG to excessive heat energy because $sCO_2$ taken directly from the heat exchanger may increase the vaporization rate to an excessive or unacceptable amount. The controllable bypass in one embodiment addresses and fixes this problem by controlling the amount of heat energy sent to the inlet 245 of the evaporator 208.

While the specific hardware implementation of the controller 250 is subject to design choices, one particular example includes one or more processors coupled with a current driver. The one or more processors may include any electronic circuits and/or optical circuits that are able to perform the functions described herein. For example, the processor(s) may perform any functionality described herein for controller 250. The processor(s) may include one or more central processing units (CPUs), microprocessors, Digital Signal Processors (DSPs), Application-specific Integrated Circuits (ASICs), Programmable Logic Devices (PLDs), control circuitry, etc. Some examples of processors include INTEL® CORE™ processors, Advanced Reduced Instruction Set Computing (RISC) Machines (e.g., ARM® processors), etc. The controller 250 may be coupled to any of the components 206 that implement the non-recuperated $sCO_2$ cycle and controllable bypass, including the gas turbine engine 202, the fuel injection system 204, and other electronic control devices via hardware or network connections used in the aircraft. In FIG. 2, lines representing the aforementioned electrical/optical interconnections to the various components and elements are largely omitted to unduly obscure the principles of operation set forth in FIG. 2.

It should be underscored that the controller 250 as defined herein may comprise one controller, or a plurality of identical or dissimilar controllers located at different areas within the system or the aircraft. For example, the controller 250 as defined herein may include two or more independent controllers, each for performing one or more separate functions. If more than one controller is implemented (that is, the controller is partitioned into two or more controllers), some or all of the control/processing elements may be connected together or networked together, whether wirelessly or through hardware connections, cables, wires, or other conductive traces. These connections may potentially include intervening components, such as hardware, combinational logic, transistor arrays, passive devices (e.g., resistors, capacitors, inductors, transformers, diodes), and the like. The controller 250 is therefore deemed to embody each of these variations and is simplified in block form in FIG. 2 to enable focus on the physical components executing the cycle and their inter-workings.

As noted, the $sCO_2$ turbine 226 is connected to the $sCO_2$ compressor by an $sCO_2$ shaft 214. The $sCO_2$ shaft 214 may also be coupled to a gearbox 236 in the high pressure shaft (ShH) 241 of engine 202. Through this connection, the $sCO_2$ shaft 214 is able to provide additional power generation capability to the high pressure shaft 241 in the engine 202, thereby increasing overall thrust of the aircraft. In other configurations, the power created by the main $sCO_2$ stream through the $sCO_2$ turbine may be used to rotate the shaft to generate additional power for other uses within the aircraft.

After the main and secondary $sCO_2$ streams are recombined at mixer 224, the resulting $sCO_2$ is routed through a channel to inlet 245 of the evaporator 208 in the fuel injection system 204. The evaporator 208 includes two channels for routing fluids. LNG 228 flows through a first channel of the evaporator 208 via inlet 229. The $sCO_2$ flows through a second channel of the evaporator 208 via inlet 245. The evaporator 208 uses the heat from the $sCO_2$, in turn, to heat the LNG 228 as it enters the evaporator 208.

The controller 250 may adjust the flow rate of the LNG 228. Per the controllable bypass discussed above, the $sCO_2$ is configured to include sufficient heat energy to transform the LNG 228 into gaseous form, or GNG 230, upon absorbing the heat energy. Thereupon, the GNG 230 exits the heat exchanger at outlet 243. The GNG 230 is next injected through a suitably-positioned channel or conduit into the burner 238 of the gas turbine engine 202. The injection rate of the GNG 230 may be carefully adjusted as needed by the controller 250. Through the non-recuperated $sCO_2$ cycle, sufficient heat has been added to the fuel injection system 204 to enable GNG 230 to be controllably injected into the gas turbine engine 202, with a potential surplus of useful work from the $sCO_2$ shaft 214 to add even more thrust as desired. The controllable flow of the GNG 230 may result in some embodiments from interaction by the controller 250 which may adjust the various inlets and outlets in the burner to facilitate that the periodic amount of GNG 230 flowing to the burner is appropriate in view of the engine specifications, thrust desired, and other factors.

The LNG-powered gas turbine engine 202 can otherwise work as a conventional turbofan engine. The airstream enters the engine through the inlet 248, facilitated by the fan 246, which creates a suction at the inlet 248 for collecting an enormous quantity of air. At the splitter 244, the airstream is segregated into a primary stream and a bypass stream, the bypass stream circumferentially or peripherally surrounding the primary airstream. In an embodiment, the primary stream enters a low pressure compressor (CmpL) 242 and then the high pressure compressor (CmpH) 240, which include compressor blades (rotors) and stationary airfoil-shaped blades (stators). As the airstream moves through the low and high pressure compressors 242 and 240, the successive rotor blades become progressively smaller as additional energy and pressure are continuously added to the airstream. The compressors 240 and 242 have the net effect of both adding overall pressure and energy to the airstream and converting the rotational energy present in the airstream into more linear direction parallel to the longitudinal axis of the engine 202. The compressed gas of the airstream is then heated in the burner 238, also referred to as the combustor, where the GNG 230 is ignited and combusts. After this process, the high pressure, high temperature airstream enters a high pressure turbine (TrbH) 234 and then a low pressure turbine (TrbL) 232. The turbines may include a series of airfoil-shaped blades that are made to spin when meeting the heated primary airstream and thereby turn the high speed shaft 241, or the low speed shaft (ShL) 252 to which the turbines 234 and 232 are respectively connected. Because the low pressure shaft 252 and the high pressure shaft 241 are also coupled, respectively, to the low pressure compressor 240 (for ShL 252), and the high pressure compressor 240 and the fan 246 (for ShL 252) in this embodiment, the physical operation of the compressor and fan are sustained for continuous engine operation.

Thereafter, in an embodiment, at least a portion of the primary exhaust gases created by the heated and compressed primary airstream is routed through a channel of the heat exchanger 218 to again transfer heat to the components of the non-recuperated $sCO_2$ Brayton cycle, as detailed above. After passing through the heat exchanger 218, the exhaust of the primary stream may be expanded to the ambient through the primary nozzle (NozPrim) 216. The bypass stream also may add significant thrust (in some cases, the majority of the thrust) for the aircraft as it exits the secondary nozzle (NozSec) 254, which peripherally surrounds the primary nozzle 216 in typical embodiments. It is also noteworthy that the high pressure compressor 240 and the high pressure turbine 234 are also connected via high pressure shaft 241 to the gearbox 236 for additional power generation according to an aspect of the present disclosure.

Beneficially, the systems and method described above solve the longstanding problem of sustaining LNG engine operation in a continuous and logical manner, without introducing significant unnecessary components and interconnects to an already complex system to generate thrust to power the aircraft. The above described embodiments, however, have additional advantages. In addition to successfully effectuating combustion and providing for additional power generation, the heating of the LNG using the above-described $sCO_2$ Brayton cycle enables the fuel injection system 204 to be physically positioned some prescribed distance away from the engine airstream prior to fuel injection. This relative positioning reduces the complexity of the system, because the GNG 230 can flow through at least one dedicated channel directly to the burner 238. This benefit can be seen, for example, by comparing the above embodiments to theoretical proposals that consider using gas exiting compressors as a heat source for the LNG 228. The latter case would likely entail some unnatural integration of the fuel injection system 204 and the gas turbine engine 202, which even if feasible on its face would require additional hardware that may introduce additional interconnections and additional failure points, and therefore could compromise the performance or integrity of the gas turbine engine 202.

In various embodiments, the LNG 228 may be composed primarily of methane, with some other elements in less proportion such as propane, butane, and possible traces of nitrogen. For purposes of this disclosure and the appended claims, the terms "liquid natural gas" or "LNG" also apply to cryogenic fuels that require gasification prior to combustion. For example, in other embodiments, the principles of the present disclosure are equally applicable to hydrogen, and the LNG 228 may be construed for purpose of this disclosure to constitute liquid hydrogen. Other variations and types of natural and cryogenic gases are also possible and are referenced within the scope and spirit of the present disclosure as LNG, and, after gasification, GNG.

FIG. 4 is an example flow diagram of a method for implementing the non-recuperated Brayton cycle according to an embodiment. The steps in FIG. 4 may be performed by the various components 206, the engine 202 or elements therein, the fuel injection system 204 including the evaporator 208, and the controller 250. Air or gas channels between any of the elements described in FIG. 2 may be involved as well in implementing the steps of FIG. 4. Feedback from the non-recuperated $sCO_2$ Brayton cycle may be obtained from various sensors distributed across the system or connected to or proximate various components.

Beginning with logic block 402 of FIG. 4, the primary exhaust of a gas turbine engine, or a portion thereof, is circulated through a heat exchanger arranged at or adjacent a primary exhaust nozzle to absorb heat energy for maintaining a supercritical state of the $sCO_2$ and ultimately, for use in vaporizing the LNG. At logic block 404, the heated $sCO_2$ is received at an airflow splitter from the heat exchanger. Thereupon, at logic block 406 and per the control bypass feature, the splitter passes a portion of the heated $sCO_2$ through an $sCO_2$ turbine. The $sCO_2$ turbine is coupled with an $sCO_2$ shaft. The $sCO_2$ shaft, in turn, is coupled with an $sCO_2$ compressor. At logic block 408, a remaining portion of the heated $sCO_2$ not passed through the $sCO_2$ turbine is bypassed through a different airflow channel. At logic block 410, this remaining portion of the heated $sCO_2$ flows through a pressure control valve. In an embodiment, the controller can control the pressure control valve to equalize a pressure of the remaining portion of the heated $sCO_2$ with the portion of the $sCO_2$ exiting the $sCO_2$ turbine.

Next, at logic block 412, the portion of the heated $sCO_2$ is combined with the remaining portion of the heated $sCO_2$ by a mixer as regulated by the controller. Separately, at logic block 414 with reference to the fuel injection system 204, the LNG is passed from a storage tank through a first inlet of an evaporator in the fuel injection system. Meanwhile, at logic block 416 and referring back to the $sCO_2$ Brayton cycle, the recombined $sCO_2$ from the mixer is routed to a second inlet of the evaporator. As it passes through the evaporator, the $sCO_2$ has an amount of heat energy sufficient to vaporize the LNG into GNG at a first outlet of the evaporator. Next, at logic block 418, the $sCO_2$ exiting a second outlet of the evaporator is sent through the $sCO_2$ compressor for generating additional power via the $sCO_2$ shaft. In an embodiment, such as at logic block 420, the mass flow rate of the Brayton cycle may be controlled by passing the $sCO_2$ exiting the evaporator through another pressure control valve to effectuate a controlled pressure drop prior to sending the $sCO_2$ through the $sCO_2$ compressor. In this example, the other pressure control valve would be arranged between the second outlet of the evaporator and the $sCO_2$ compressor input. The flow of the heated portion of the $sCO_2$ through the turbine and the compression of the $sCO_2$ compressor cause the $sCO_2$ shaft to rotate. At logic block 422, the $sCO_2$ shaft engages a gearbox positioned in the engine between the main turbine and a main shaft to generate the additional power described above.

After the $sCO_2$ passes through the $sCO_2$ compressor to thereby engage the $sCO_2$ shaft, at logic block 424, the $sCO_2$ flowing out of the $sCO_2$ compressor is recirculated through the heat exchanger, to be heated up once again by the primary exhaust gases, thereby maintaining a continuous $sCO_2$ Brayton cycle. The controller may regulate this flow by being coupled to one or more of the components 206 (FIG. 2) and other elements in the engine 202 and fuel injection system 204. At logic block 426 of FIG. 4, referring back to the fuel injection system, a controlled amount of GNG from the evaporator may be injected into a burner disposed in the engine for combusting the GNG. As in the examples above, the burner is coupled between a main compressor and a main turbine through which a primary airstream from a main inlet of the engine passes to create energy for operating the main turbine and thereby rotating a main shaft of the engine.

For purposes of the embodiments described above, the engine 202 may include at least one main turbine, at least one main compressor, and at least one main shaft. That is to say, the main turbine may be construed to include one main turbine or a plurality of main turbines. The main compressor may be construed to include one main compressor or a plurality of main compressors. The main shaft may similarly be construed to include one main shaft or a plurality of main shafts. The $sCO_2$ shaft may be coupled via gearbox 236 (FIG. 2) to any of the main turbines, and consequently the gearbox 236 may be coupled to the main shaft (if more than one) associated with that particular one of the main turbines.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A system for a Liquid Natural Gas (LNG)-powered aircraft, comprising:

a LNG turbine engine including a burner coupled between a main compressor and a main turbine, a main shaft coupled to the main turbine and the main compressor, and a heat exchanger through which a primary exhaust gas from the LNG turbine engine flows for heating a supercritical carbon-dioxide ($sCO_2$);

a fuel injection system coupled to the burner and including an evaporator, the evaporator comprising a first inlet through which the LNG flows, and comprising a first outlet;

components for implementing a non-recuperated $sCO_2$ Brayton cycle, the components including:

a $sCO_2$ turbine coupled between the heat exchanger and a second inlet of the evaporator;

a $sCO_2$ compressor having an input coupled to a second outlet of the evaporator and an output coupled to an input of the heat exchanger for recirculating the $sCO_2$ through the heat exchanger;

a $sCO_2$ shaft coupled to the $sCO_2$ turbine and the $sCO_2$ compressor;

a controllable bypass, comprising:

a splitter disposed between the heat exchanger and an input to the $sCO_2$ turbine for receiving the $sCO_2$ from the heat exchanger and configured to split the $sCO_2$ into a first portion of the $sCO_2$ and a second portion of the $sCO_2$, the first portion of the $sCO_2$ entering the $sCO_2$ turbine, wherein the first portion of the $sCO_2$ from the heat exchanger flows through the $sCO_2$ turbine for rotating the $sCO_2$ shaft to operate the $sCO_2$ compressor, wherein the second portion of the $sCO_2$ from the heat exchanger bypasses the $sCO_2$ turbine, and wherein the $sCO_2$ from the second outlet of the evaporator is compressed by the $sCO_2$ compressor; and a pressure control valve configured to receive the second portion of the $sCO_2$ from the splitter and to equalize a pressure drop between the first portion of the $sCO_2$ at an output of the $sCO_2$ turbine with the second portion of the $sCO_2$;

a mixer arranged between the output of the $sCO_2$ turbine and the second inlet of the evaporator, wherein the mixer is configured to recombine the first portion of the $sCO_2$ exiting the $sCO_2$ turbine with the second portion of the $sCO_2$ that bypassed the $sCO_2$ turbine for supplying sufficient heat to the second inlet of the evaporator to vaporize the LNG into a Gaseous Natural Gas (GNG); and a controller, wherein the controller is configured to adjust a flow of the first portion of the $sCO_2$ to the $sCO_2$ turbine and a flow of the second portion of the $sCO_2$ to the mixer by specifying a relative quantities of the first portion of the $sCO_2$ and the second portion of the $sCO_2$, wherein the controller is further configured to inject a controlled amount of the GNG from the evaporator into the burner for providing a prescribed amount of heat for combusting the GNG to operate the engine, wherein the controller is configured to control the pressure control valve to equalize a pressure of the second portion of the $sCO_2$ with a pressure of the first portion of the $sCO_2$ exiting the $sCO_2$ turbine.

2. The system of claim 1, wherein the engine is a turbofan engine.

3. The system of claim 1, wherein the pressure control valve is disposed between the second outlet of the evaporator and the $sCO_2$ compressor, the pressure control valve being configured to control a cycle mass flow rate of the $sCO_2$.

4. The system of claim 1, wherein the LNG is blended with liquid hydrogen.

5. The system of claim 1, wherein the heat exchanger is positioned in or adjacent a primary engine nozzle.

6. The system of claim 1, wherein the main turbine comprises a high pressure turbine and a low pressure turbine.

7. The system of claim 1, wherein the main shaft comprises a high pressure shaft and a low pressure shaft.

8. The system of claim 1, wherein the main compressor comprises a high pressure compressor and a low pressure compressor.

9. The system of claim 1, wherein the engine further includes a gearbox positioned between the main turbine and the main shaft, wherein the gearbox is coupled to the $sCO_2$ shaft, such that the $sCO_2$ shaft and the gearbox are configured to provide additional power via the $sCO_2$ from the heat exchanger that flows through the $sCO_2$ turbine.

10. The system of claim 9, wherein the controller is configured to control, using the controllable bypass, a first amount of energy used to generate the additional power and a second amount energy used to heat the LNG.

11. The system according to claim 1, further comprising:
a first fluid channel between the heat exchanger and the evaporator for delivering the $sCO_2$ to the second inlet of the evaporator such that the $sCO_2$ flowing through the heat exchanger causes the LNG to convert to the GNG as the GNG flows through the first outlet of the evaporator;
a second fluid channel between the second outlet of the evaporator and the $sCO_2$ compressor for repressurizing the $sCO_2$; and
a third fluid channel between the output of the $sCO_2$ compressor and the heat exchanger for recirculating the $sCO_2$ back through the heat exchanger, wherein
the GNG is configured to controllably flow through a conduit to the burner to enable combustion for a sustained operation of the engine to power the aircraft.

12. The system of claim 11, wherein the controller is configured to control an amount of heat energy of the $sCO_2$ sufficient to convert the LNG into the GNG.

13. A method for a Liquid Natural Gas (LNG)-powered gas turbine engine, comprising:
circulating a primary exhaust of the gas turbine engine through a heat exchanger arranged at or adjacent a primary exhaust nozzle to thereby absorb heat energy;
receiving a supercritical carbon-dioxide ($sCO_2$) from the heat exchanger;
splitting the $sCO_2$ into a first portion and a remaining portion, wherein relative quantities of the first portion and the remaining portion are specified by a controller;
passing the first portion of the $sCO_2$ through a $sCO_2$ turbine, the $sCO_2$ turbine being coupled with a $sCO_2$ shaft, the $sCO_2$ shaft being coupled with a $sCO_2$ compressor;

bypassing the remaining portion of the $sCO_2$ through a different channel;
recombining the first portion of the $sCO_2$ with the remaining portion of the $sCO_2$;
passing the LNG through a first inlet of an evaporator arranged in a fuel injection system;
routing the $sCO_2$ to a second inlet of the evaporator, the $sCO_2$ having a heat energy sufficient to vaporize the LNG into a Gaseous Natural Gas (GNG) at a first outlet of the evaporator;
sending the $sCO_2$ exiting a second outlet of the evaporator through the $sCO_2$ compressor;
recirculating the $sCO_2$ flowing out the $sCO_2$ compressor through the heat exchanger;
injecting a controlled amount of the GNG from the evaporator into a burner disposed in the engine for combusting the GNG, the burner being coupled between a main compressor and a main turbine through which a primary airstream from a main inlet of the engine passes to provide energy for operating the main turbine and thereby rotating a main shaft of the engine; and
passing the remaining portion of the sCO2 through a pressure control valve and equalizing a pressure drop of the remaining portion of the sCO2 with the first portion of the sCO2 exiting the sCO2 turbine.

14. The method of claim 13, wherein an amount of the heat energy of the $sCO_2$ and the controlled amount of the GNG are regulated by the controller.

15. The method of claim 13, further comprising controlling a cycle mass flow rate, comprising passing the $sCO_2$ exiting the evaporator through another pressure control valve prior to sending the $sCO_2$ through the $sCO_2$ compressor.

16. The method of claim 13, further comprising engaging, by the $sCO_2$ shaft, a gearbox positioned in the engine between the main turbine and the main shaft to generate an additional power.

17. The method of claim 13, wherein the fuel injection system is positioned at a predetermined distance from the primary airstream.

18. The method of claim 13, wherein:
the main turbine comprises a plurality of turbines;
the main compressor comprises a plurality of respective compressors; and
the main shaft comprises a plurality of respective shafts.

* * * * *